US008947489B2

(12) United States Patent
Lindberg

(10) Patent No.: US 8,947,489 B2
(45) Date of Patent: Feb. 3, 2015

(54) VIDEO CALL SERVICE

(75) Inventor: Phillip Lindberg, Helsinki (FI)

(73) Assignee: Tellybean Oy, Helsinki (FI)

( * ) Notice: Subject to any disclaimer, the term of this patent is extended or adjusted under 35 U.S.C. 154(b) by 158 days.

(21) Appl. No.: 13/569,266

(22) Filed: Aug. 8, 2012

(65) Prior Publication Data
US 2014/0043423 A1 Feb. 13, 2014

(51) Int. Cl.
H04N 7/15 (2006.01)
H04L 29/06 (2006.01)
H04N 7/14 (2006.01)
H04L 29/08 (2006.01)

(52) U.S. Cl.
CPC ............... H04N 7/157 (2013.01); H04L 65/00 (2013.01); H04N 7/147 (2013.01); H04N 7/148 (2013.01); H04L 65/1053 (2013.01); H04L 65/1069 (2013.01); H04L 67/1044 (2013.01)
USPC .................. 348/14.01; 348/14.02; 348/14.08; 348/14.09

(58) Field of Classification Search
CPC .......... H04W 4/00; H04N 7/14; H04N 7/157; H04N 7/148; H04N 7/147
USPC .............................. 348/14.01–14.16; 709/204
See application file for complete search history.

(56) References Cited

U.S. PATENT DOCUMENTS

2002/0065728 A1* 5/2002 Ogasawara ................. 705/23
2007/0038720 A1* 2/2007 Reding et al. .............. 709/217
2010/0321465 A1* 12/2010 Behrens .................... 348/14.02

* cited by examiner

Primary Examiner — Melur Ramakrishnaiah
(74) Attorney, Agent, or Firm — Ziegler IP Law Group, LLC

(57) ABSTRACT

A videophone apparatus includes a communication interface for communicating with a system server and a peer; at least one processor; and at least one memory including computer program code; the at least one memory and the computer program code cause the videophone apparatus to connect the videophone apparatus via a first wireless connection to the system server; transmit authentication information from the videophone apparatus to the system server via the first wireless connection for initiating account generation for at least one video call service; and receive client information from the system server. The videophone apparatus further determines a client application based on the received client information; establishes a peer-to-peer connection between the videophone apparatus and the peer over a second wireless connection; and triggers a video call service over the peer-to-peer connection utilizing the determined client application and the account generated by the system server.

14 Claims, 5 Drawing Sheets

US 8,947,489 B2

VIDEO CALL SERVICE

TECHNICAL FIELD

The present application generally relates to a method, a system and an apparatus for providing a video call service.

BRIEF DESCRIPTION OF RELATED DEVELOPMENTS

Video calls are widely used as a communication method providing people not only speech but streaming video of the other party as well. High-speed telecommunication networks enable video call activation between computers and cellular phones.

However, using computers or cellular phones for video calls has certain drawbacks. A complex registration and device configuration regime may be needed until the video call is available. Account creation for a video call service may require a number of steps by the user and understanding of the related technology and terminology. Furthermore, users need to be aware of available services that they may even registrate for, as well as the contact information of the peer entities they may want to contact with the services. Finally, existing consumer services are targeted towards individual users—the constraints of which are categorically inappropriate for groups (e.g. families, company units, etc.) using shared devices. The very notion of identity, accounts, credentials and system management are not addressed in any meaningful our useful way.

Thus, a solution is needed that is easy to set-up, easy-to-use, low maintenance (e.g. software updates, account credential management, etc.), low-cost and highly-functional to provide video call service for the user.

SUMMARY

According to a first example aspect of the disclosed embodiments there is provided a videophone apparatus comprising:
 a communication interface for communicating with a system server and a peer;
 at least one processor; and
 at least one memory including computer program code;
 the at least one memory and the computer program code configured to, with the at least one processor, cause the videophone apparatus to:
 connect the videophone apparatus via a first wireless connection to the system server;
 transmit authentication information from the videophone apparatus to the system server via the first wireless connection for initiating account generation for at least one video call service;
 receive client information from the system server;
 determine a client application based on the received client information;
 establish a peer-to-peer connection between the videophone apparatus and the peer over a second wireless connection; and
 trigger a video call service over the peer-to-peer connection utilizing the determined client application and the account generated by the system server.

The first and the second wireless connection may comprise at least one of the following:
 a cellular network data connection; and
 a wireless local area network (WLAN) connection.

In an embodiment, the videophone apparatus further comprises a videophone input apparatus and an A/V output apparatus, wherein the videophone input apparatus not comprising a display.

In an embodiment, the authentication information may comprise at least one credential. The credential may comprise at least one of the following:
 an International Mobile Equipment Identity (IMEI);
 an International Mobile Subscriber Identity (IMSI);
 a Mobile Subscriber ISDN Number (MSISDN);
 a unique hardware identifier (HWID);
 a unique software identifier (SWID); and
 a unique service identifier (SVID).

Unique hardware, software and service identifiers may be generated by corresponding device, software or service provider, for example.

In an embodiment, the at least one memory and the computer program code are further configured to, with the at least one processor, cause the videophone apparatus to:
 receive an incoming video call request from the peer;
 transmit information on the received incoming video call request to the system server; and
 receive client information from the system server in response to the transmitted information.

In an embodiment, the client information may comprise at least one of the following:
 a client application identifier for determining the client application;
 a username of the account generated by the system server; and
 a password of the account generated by the system server.

According to a second example aspect of disclosed embodiments there is provided a system server comprising:
 a communication interface for communicating with a videophone apparatus and a service provider;
 at least one processor; and
 at least one memory including computer program code;
 the at least one memory and the computer program code configured to, with the at least one processor, cause the system server to:
 connect the system server via a first wireless connection to the videophone apparatus;
 receive authentication information from the videophone apparatus via the first wireless connection;
 connect the system server to the service provider of a video call service;
 initiate account generation for the video call service; and
 transmit client information to the videophone apparatus based on account information of the generated account.

In an embodiment, the account information comprises a user account and a password.

In an embodiment, the at least one memory and the computer program code are further configured to, with the at least one processor, cause the system server to:
 maintain the account information for the video call service.

In an embodiment, the account information may comprise peer contact information, and
 the at least one memory and the computer program code are further configured to, with the at least one processor, cause the system server to:
 receive contact information from the service provider; and
 update the peer contact information based on the received contact information.

According to a third example aspect of the disclosed embodiments there is provided a method comprising:
 connecting a videophone apparatus via a first wireless connection to a system server;

transmitting authentication information from the videophone apparatus to the system server via the first wireless connection for initiating account generation for at least one video call service;

receiving client information from the system server;

determining a client application based on the received client information;

establishing a peer-to-peer connection between the videophone apparatus and the peer over a second wireless connection; and triggering a video call service over the peer-to-peer connection utilizing the determined client application and the account generated by the system server.

According to a fourth example aspect of the disclosed embodiments there is provided a computer program embodied on a computer readable medium comprising computer executable program code, which when executed by at least one processor of a videophone apparatus, causes the videophone apparatus to:

connect a videophone apparatus via a first wireless connection to a system server;

transmit authentication information from the videophone apparatus to the system server via the first wireless connection for initiating account generation for at least one video call service;

receive client information from the system server;

determine a client application based on the received client information;

establish a peer-to-peer connection between the videophone apparatus and the peer over a second wireless connection; and trigger a video call service over the peer-to-peer connection utilizing the determined client application and the account generated by the system server.

According to a fifth example aspect of the disclosed embodiments there is provided a system comprising:

a videophone apparatus, configured to:

connect the videophone apparatus via a first wireless connection to a system server;

transmit authentication information from the videophone apparatus to the system server via the first wireless connection;

receive client information from the system server;

determine a client application based on the received client information;

establish a peer-to-peer connection between the videophone apparatus and the peer over a second wireless connection; and trigger a video call service over the peer-to-peer connection utilizing the determined client application and the account generated by the system server;

the system server, configured to:

receive authentication information from the videophone apparatus via the first wireless connection;

connect the system server to a service provider of a video call service;

initiate account generation for the video call service; and transmit client information to the videophone apparatus based on account information of the generated account;

a peer configured to:

establish the peer-to-peer connection between the videophone apparatus over a second wireless connection; and the service provider, configured to:

provide video call service.

Different non-binding example aspects and embodiments of the disclosure have been illustrated in the foregoing. The above embodiments are used merely to explain selected aspects or steps that may be utilized in implementations of the present invention. Some embodiments may be presented only with reference to certain example aspects of the invention. It should be appreciated that corresponding embodiments may apply to other example aspects as well.

BRIEF DESCRIPTION OF THE DRAWINGS

The aspects of the disclosed embodiments will be described, by way of example only, with reference to the accompanying drawings, in which.

DETAILED DESCRIPTION

In the following description, like numbers denote like elements.

Figure 1:
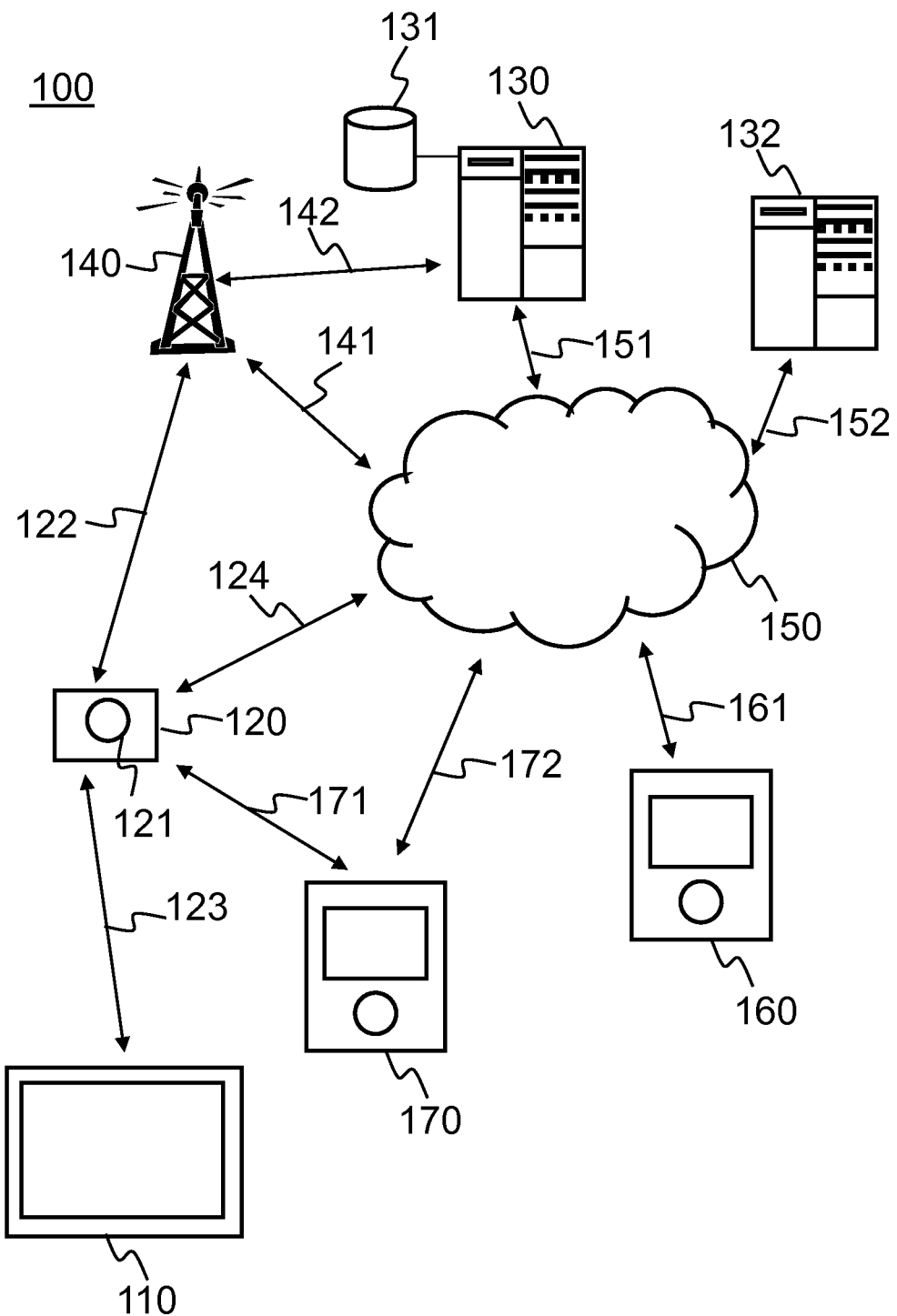
FIG. 1 shows a schematic picture of a system according to an aspect of the disclosed embodiments.

FIG. 1 shows a schematic picture of a system 100 according to an example embodiment. A user apparatus, such as a videophone apparatus 120 may comprise a mobile terminal comprising a communication interface, for example. The videophone apparatus 120 is capable of downloading and locally executing software program code. The software program code may be a client application of a service whose server application is running on a server apparatus 130, 132 of the system 100. The videophone apparatus 120 may comprise a camera 121 for providing video stream for the video call and a microphone for providing audio stream for the video call, for example. In an embodiment, the videophone apparatus 120 may comprise a ringer or a notification speaker. The videophone apparatus 120 is configured to be connectable to a wireless communication network 140 over a wireless connection 122. The wireless connection 122 may comprise a mobile cellular network or a wireless local area network (WLAN), for example. The wireless communication network may be to a public data communication network 150, for example the Internet, over a data connection 141. The videophone apparatus 120 is configured to be connectable to the public data communication network 150, for example the Internet, directly over a data connection 124 that may comprise a fixed broadband access.

In an embodiment, the system 100 comprises an A/V output apparatus 110 configured to be connectable to the videophone apparatus 120 over a local connection 123. The local connection 123 may comprise a wired connection or a wireless connection. The wired connection may comprise Universal Serial Bus (USB), High-Definition Multimedia Interface (HDMI), SCART interface or RCA interface, for example. The wireless connection may comprise Bluetooth™, Radio Frequency Identification (RF-ID) or wireless local area network (WLAN), for example. Near field communication (NFC) may be used for device identification between the A/V output apparatus 110 and the videophone apparatus 120, for example. The A/V output apparatus 110 may comprise a television, for example.

In an embodiment, the videophone apparatus 120 is a videophone input apparatus not comprising a display but using an external display apparatus, such as an A/V output apparatus 110 for presenting information to the user.

In an embodiment, the videophone apparatus 120 is a dongle apparatus. Connecting the dongle apparatus 120 to the external display apparatus, such as an A/V output apparatus 110, the videophone service may be unlocked. The dongle apparatus 120 may be, for example, a wireless USB modem connected to a USB port of the A/V output apparatus 110, such as a television. After the connection, videophone application software and hardware/software/service credentials may be downloaded from the dongle apparatus 120 to the A/V output apparatus 110 and the videophone service unlocked. After the service is unlocked, service may be used, remote configuration may be done and metrics provided. The dongle solution provides easy to install and use for the user and a control point for the service operator utilizing, for example, a subscriber identity module (SIM) of the dongle apparatus 120.

In an embodiment, the system 100 comprises a server apparatus 130, which comprises a storage device 131 for storing service data, service metrics and subscriber information, over data connection 151. The service data may comprise configuration data, account creation data, peer-to-peer service data over cellular network and peer-to-peer service data over wireless local area network (WLAN), for example. The service metrics may comprise operator information for use in both user identification and preventing service abuse, as the device 120 and the user account are locked to a subscriber of an operator network using the subscriber identity module (SIM) of the device 120 and the service account details.

In an embodiment, service data may travel over different paths. A first path may comprise sending configuration information over a wireless communication network 122, 140, 142 from the server apparatus 130. A second path may comprise sending account creation data between the server apparatus 130 and a peer-to-peer service apparatus 160 over the data connection 150, 151, 161, for example.

In an embodiment, a proprietary application in the videophone apparatus 120 may be a client application of a service whose server application is running on the server apparatus 130 of the system 100 and whose peer-to-peer client application is running on the peer-to-peer service apparatus 160. The proprietary application may capture the user input data for the videophone service and provide the user output data, from the peer, for the videophone service using output devices of the videophone apparatus 120 or using the A/V output apparatus 110 over the local connection 123. In an embodiment, configuration information between the videophone apparatus 120 and the system server 130 is transceived via the first wireless connection 122, 140, 142 automatically and configured by the server apparatus 130. Thus the user of the videophone apparatus 120 may not need to do any initialization or configuration for the service. The system server 130 may also take care of account creation process for the service, such as videophone service between the videophone apparatus 120 and the peer 160.

In an embodiment, the system 100 comprises a service provider server apparatus 132, for storing service data, service metrics and subscriber information, over data connection 152. The service data may comprise service account data, peer-to-peer service data and service software, for example.

The service provider server apparatus 132 may provide the video call service for the video phone apparatus 120 and the peer 160, whereas the system server 130 is responsible for negotiating account information and client applications for the videophone apparatus 120 with the service provider server apparatus 132.

In an embodiment, a proprietary application in the videophone apparatus 120 may be a client application of a service whose server application is running on the server apparatus 132 of the system 100 and whose peer-to-peer client application is running on the peer-to-peer service apparatus 160. The proprietary application may capture the user input data for the videophone service and provide the user output data, from the peer, for the videophone service of the service server 132 using, for example, the A/V output apparatus 110 over the local connection 123. In an embodiment, configuration information between the videophone apparatus 120 and the system server 130 is transceived via the first wireless connection 122, 140, 142 automatically and configured by the system server apparatus 130. Furthermore, the system server apparatus 130 may automatically create a service account in the service server 132, for the videophone apparatus 120. Thus the user of the videophone apparatus 120 may not need to do any initialization or configuration for the service. Thus, the system server 130 may take care of account creation process for the service, such as videophone service between the videophone apparatus 120 and the peer 160.

In an embodiment, the system server apparatus 130 not only configures and creates the account, but also facilitates editing of account credentials (where applicable). For example, when the username created for any $3^{rd}$ party service (such as Skype, for example) must be unique (within that service) the name used by the videophone system service (nickname, screen name, etc.) can be non-unique, and editable. The server 130 may generate a short user-friendly name upon account creation (e.g. "smile0032") that the user can later personalize. This may be done using a web application. The first time the users sign-in, they will be asked, for example, "what would you like to call your TV". In response, they can change it from "smile0132" (the generated name) to "Jones family TV" (personalized name). Such modification will be sent from the system server apparatus 130 to service server 132 (Skype, Gtalk, etc.) as a "profile edit". These "Names" have very nice properties. Firstly, they are often prioritized in contact search results. Secondly, they are not required to be unique. Thus the videophone service system does not need to check for availability within any service. The ultimate goal here is that one videophone service name can be reused across all subsequent services.

In an embodiment, a user of the videophone apparatus 120 can make and receive video calls and contact requests from a contact list relating to any peer regardless of the underlying service—without having to manage accounts (account creation, sign-in, etc.) or install multiple applications. Such solution harmonizes service fragmentation, simplifies set-up, supports a shared (family) account and reduces complexity in the context of video calling on TV.

In an embodiment, authentication of a videophone apparatus 120 on a system server 130 may utilize hardware or SIM credentials, such as International Mobile Equipment Identity (IMEI) or International Mobile Subscriber Identity (IMSI). The videophone apparatus 120 may transmit authentication information comprising IMEI and/or IMSI, for example, to the system server 130. The system server 130 authenticates the videophone apparatus 120 by comparing the received authentication information to authentication information of registered users stored at the system server database 131, for example.

In an embodiment, after authentication step, the system server 130 may initiate automatic account generation for third party video call services provided by service provider servers 132, such as Skype or Gtalk, for example.

In an embodiment, incoming video call requests from peers 160 to the videophone apparatus 120 may be negotiated by the system server 130. Based on the negotiation, the system server 130 may instruct the videophone apparatus 120 of which client application in the apparatus 120 to use to establish the peer to peer connection for a video call between the videophone apparatus 120 and the peer 160.

In an embodiment, accounts for video call services provided by service providers 132 may be generated automatically by the system server 130. The system server may use the authentication information (in part or as a whole) of the videophone apparatus 120 for account creation to services provided by the service providers 132. The system server 130 negotiates with the service provider 132 to generate credentials for the service provided by the service provider 132. The credentials may comprise a username and a password required to access the service of the service provider 132. For example, the username generated for the service of the service provider 132 may be based on a combination of IMSI (from 120) combined with a two-letter prefix [e.g. TW442937004711205] (to comply with the service provider 132 alphanumeric username criteria, for example), whereas both the password and the name may be generated by an algorithm on the system server 130. The credentials may be maintained at the system server 130. Furthermore, the system server 130 may carry out contact search queries and contact authentication between the system server 130 and the service provider 132. The contact search queries enable importing of peer contact information to a contact list for the videophone apparatus 120. The system server 130 may fetch contact information for the videophone apparatus 120 from various service providers 132 and peers 160, for example.

In an embodiment, a peer to peer video call connection may be enabled by one of a multitude of client applications that are components of a videophone apparatus 120 application. Third party account credentials (usernames, passwords, etc.) may be hosted by the system server 130 and utilized when needed for video call setup (calling or answering), for example.

In an embodiment, a service web application may be used for configuration of a system. The service web application may be run on any control apparatus 170 connected to a public data network, such as internet 150, for example. The control apparatus 170 may also be connected locally to the videophone apparatus 120 over a local connection 171 and utilize the network connections 122, 124 of the videophone apparatus 120 for configuration purposes. The service web application of the control apparatus 170 may provide searching/adding contacts, personalizing screen name, Wi-Fi Setup and apparatus 120 configurations, for example. The service web application of the control apparatus 170 may be a general configuration tool for tasks being too complex to be performed on the user interface of the videophone apparatus 120, such as entering text, for example.

In an embodiment, a videophone call may be established as a peer-to-peer connection between the videophone apparatus 120 and the peer 160 over a second wireless connection 122, 140, 141 to the public data communication network 150, 161 and to the peer 160. The second wireless connection 122, 140, 141 may comprise for example a wireless local area network connection, such as Wi-Fi.

In an embodiment, a videophone call may be established as a peer-to-peer connection between the videophone apparatus 120 and the peer 160 over a second wireless connection 122, 140, 142 to the public data communication network 150, 161 and to the peer 160. The second wireless connection 122, 140, 142 may comprise for example a cellular network connection provided by an operator of the system server 130.

In an embodiment, a videophone call may be established as a peer-to-peer connection between the videophone apparatus 120 and the peer 160 over a data connection 124 to the public data communication network 150, 161 and to the peer 160. The data connection 124 may comprise for example a wired local area network connection.

In an embodiment, the videophone apparatus 120 may be connected over a local connection 171 to a control apparatus 170, such as a tablet, a laptop, a remote controller, a PDA or a mobile phone, for example. The local connection may be a wireless connection and comprise Infrared, Bluetooth™, Radio Frequency Identification (RF-ID), local area network (LAN), wireless local area network (WLAN) or near field communication (NFC), for example. The control apparatus 170 may be used for remotely controlling the videophone apparatus 120, the system server 130, or the services relating to the system 100.

In an embodiment, the videophone apparatus 120 may be connected over a local data connection 124 to a network 150, such as Internet, and furthermore over a data connection 172 to the control apparatus 170 and over a data connection 151 to a system server apparatus 130, 131.

In an embodiment, the videophone apparatus 120 may be connected to the control apparatus 170 over a local connection 171 that may be a wireless connection and comprise Infrared, Bluetooth™, Radio Frequency Identification (RF-ID), wireless local area network (WLAN) or near field communication (NFC), for example.

The control apparatus 170 may be used for remotely controlling the videophone apparatus 120. The videophone apparatus 120 may be used primarily for consumption of media, whilst any configuration tasks (e.g. text entry for adding a friend to a contacts list) are performed elsewhere using existing tools with an appropriate affordance. In an embodiment, a web application utilizing the control apparatus 170 and a browser of the control apparatus 170 may be used to configure the videophone apparatus 120. The control apparatus 170 may be authenticated and configuration data sent from the control apparatus 170 to the system server 130, 131 wherein configuration settings for the videophone apparatus 120 are modified based on the received data. In an embodiment, the modified settings may then be sent to the videophone apparatus 120 over the network 150 and the local connection 124 or the wireless operator 141, 140, 122. For example, a SMS-based configuration message may be used to convey the configuration data.

In an embodiment, the web application utilizing the control apparatus 170 and a browser of the control apparatus 170 may use the data connection 172 thus making it remote and eliminating any need for local area connection 171.

In an embodiment, local (proximate) remote controls may use a direct local connection 171 (with IR, for example).

In an embodiment, the control apparatus 170 may comprise both data connection 172 and local connection 171 or only one of them. Different types of control apparatuses may also exist depending on their nature and available connections. One for configuration over data connection 172 and another for direct manipulation over local connection 171, where each has different constraints in terms of distance from the videophone apparatus 120, the types of applications they run (browser vs. bespoke app), latency, etc.

In an embodiment, other services and service providers than videophone service may be used. In such cases, service account creation process may be automatic for third party services as well. The service account created (e.g. for the videophone service) to the system server 130, 131 may be used to create further accounts for each service the user may choose. Such account creation may be done machine-to-machine between the system server 130, 131 and any third party, such as the service provider server 132. Thus, the system server 130, 131 may host all account credentials on behalf of the user or the group of users (e.g. a family, clubs or associated group of professionals in an office).

In an embodiment, configuration information between the videophone apparatus 120 and the system server 130 may be transceived via the first wireless connection and a peer-to-peer connection may be established between the videophone apparatus and the peer over a second wireless connection. The first connection for configuration information may be transmitted over cellular data connection (e.g. 3G or 4G) and the second connection for peer-to-peer content may be transmitted over non-cellular data connection (e.g. wireless LAN). However, the first or the second connection may be used for both purposes.

In an embodiment, the videophone apparatus 120 may comprise an A/V input apparatus.

Figure 2:
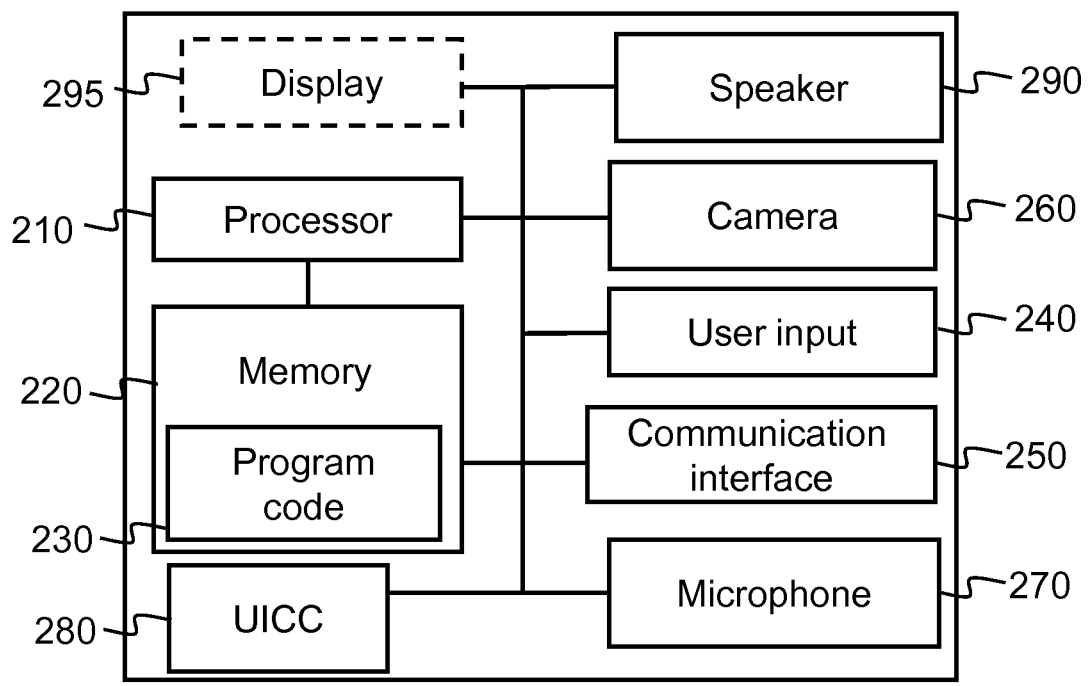
FIG. 2 presents an example block diagram of a videophone apparatus.

FIG. 2 presents an example block diagram of a videophone apparatus 120 in which various aspects of the disclosed embodiments may be applied. The videophone apparatus 120 may be a user equipment (UE), user device or apparatus, such as a mobile terminal, or other communication device comprising a communication interface, a camera and a microphone.

In an embodiment, the videophone apparatus 120 may also be a dongle apparatus 120, as described earlier in this application. In such embodiment, a camera, a microphone and a smart application of an A/V apparatus, such as a television may be used together with the dongle apparatus 120. In such embodiment, the dongle apparatus 120 may only be required to provide a TCP/IP connection via a wireless network (e.g. 3G/4G/WLAN) to the system server. The apparatus 120 may function as a "key", and may be similar to a 3G USB modem, for example. Such dongle apparatus 120 may provide a service-dedicated communication interface for configuration, primary content delivery and/or metrics/admin. Furthermore, such apparatus 120 may provide IMEI/IMSI credentials that are system/operator owned.

The general structure of the videophone apparatus 120 comprises a user input device 240, a communication interface 250, a microphone 270, a camera 260, a processor 210, and a memory 220 coupled to the processor 210. The videophone apparatus 120 further comprises software 230 stored in the memory 220 and operable to be loaded into and executed in the processor 210. The software 230 may comprise one or more software modules and can be in the form of a computer program product. The videophone apparatus 120 may further comprise a universal integrated circuit card (UICC) 280.

In an embodiment, the videophone apparatus 120 may comprise a display 295 for presenting information to a user of the apparatus 120. In case the apparatus 120 does not comprise the display 295, an external A/V apparatus 110 may be used for presenting information.

The processor 210 may be, e.g., a central processing unit (CPU), a microprocessor, a digital signal processor (DSP), a graphics processing unit, or the like. FIG. 2 shows one processor 210, but the videophone apparatus 120 may comprise a plurality of processors.

The memory 220 may be for example a non-volatile or a volatile memory, such as a read-only memory (ROM), a programmable read-only memory (PROM), erasable programmable read-only memory (EPROM), a random-access memory (RAM), a flash memory, a data disk, an optical storage, a magnetic storage, a smart card, or the like. The videophone apparatus 120 may comprise a plurality of memories. The memory 220 may be constructed as a part of the videophone apparatus 120 or it may be inserted into a slot, port, or the like of the videophone apparatus 120 by a user. The memory 220 may serve the sole purpose of storing data, or it may be constructed as a part of an apparatus serving other purposes, such as processing data. Client application data for different services provided by service providers may be stored and run in the memory 220 as well as other apparatus 120 application data.

The user input device 240 may comprise circuitry for receiving input from a user of the videophone apparatus 120, e.g., via a keyboard, a touch-screen of the videophone apparatus 120, speech recognition circuitry, gesture recognition circuitry or an accessory device, such as a headset or a remote controller, for example.

The camera 260 may be a still image camera or a video stream camera, capable for creating multimedia data for videophone service.

The speaker 290 is configured to notify a user of an incoming call and to provide other user alarm sounds. Such speaker is advantageous especially in case the A/V output apparatus 110 (e.g. TV) is in off/standby mode. The speaker 290 also allows the user to answer the incoming call and hear the caller before turning the A/V output apparatus 110 (e.g. TV) on. Thus, the user may start the conversation while searching for a remote control of the A/V output apparatus 110 (e.g. TV), for example.

The microphone 270 is configured to capture user speech information for the video call service.

In an embodiment, the microphone 270 may be used to disable the speaker 290 when identical audio output is detected, using the microphone 270, from an external source, such as the A/V output apparatus 110. The device speaker 290 may only be required when the A/V output apparatus 110 (e.g. TV) is switched off or operating at very low volumes. The additional audio output from the A/V output apparatus 110 (e.g. TV) is at a variable distance from the microphone 270 (measured in time), compared to the on-board speaker 290 (internal source) which is at a fixed/known distance from the microphone 270. The identical audio output may be detected based on audio data comparison and based on distance calculation the audio data source may be determined to be the A/V output apparatus 110 (e.g. TV) and the speaker 290 may be switched off automatically. The universal integrated circuit card (UICC) 280 is the smart card used in mobile terminals in GSM and UMTS networks. The UICC 280 ensures the integrity and security of all kinds of personal data, and it typically holds a few hundred kilobytes. In a GSM network, the UICC 280 contains a SIM application and in a UMTS network the UICC 280 contains a USIM application. The UICC 280 may contain several applications, making it possible for the same smart card to give access to both GSM and UMTS networks, and also provide storage of a phone book and other applications. It is also possible to access a GSM network using a USIM application and it is possible to access UMTS networks using a SIM application with mobile terminals prepared for this.

The communication interface module 250 implements at least part of data transmission. The communication interface module 250 may comprise, e.g., a wireless or a wired interface module. The wireless interface may comprise such as a WLAN, Bluetooth, infrared (IR), radio frequency identification (RF ID), NFC, GSM/GPRS, CDMA, WCDMA, or LTE (Long Term Evolution) radio module. The wired interface may comprise such as universal serial bus (USB), HDMI, SCART or RCA, for example. The communication interface module 250 may be integrated into the videophone apparatus 120, or into an adapter, card or the like that may be inserted into a suitable slot or port of the videophone apparatus 120. The communication interface module 250 may support one radio interface technology or a plurality of technologies. The communication interface module 250 may support one wired interface technology or a plurality of technologies. The videophone apparatus 120 may comprise a plurality of communication interface modules 250.

A skilled person appreciates that in addition to the elements shown in FIG. 2, the videophone apparatus 120 may comprise other elements, such as additional microphones, extra speakers, extra cameras, as well as additional circuitry such as input/output (I/O) circuitry, memory chips, application-specific integrated circuits (ASIC), processing circuitry for specific purposes such as source coding/decoding circuitry, channel coding/decoding circuitry, ciphering/deciphering circuitry, and the like. Additionally, the videophone apparatus 120 may comprise a disposable or rechargeable battery (not shown) for powering when external power if external power supply is not available.

In an embodiment, the videophone apparatus 120 comprises speech or gesture recognition means. Using these means, a pre-defined phrase or a gesture may be recognized from the speech or the gesture and translated into control information for the apparatus 120, for example.

Figure 3:
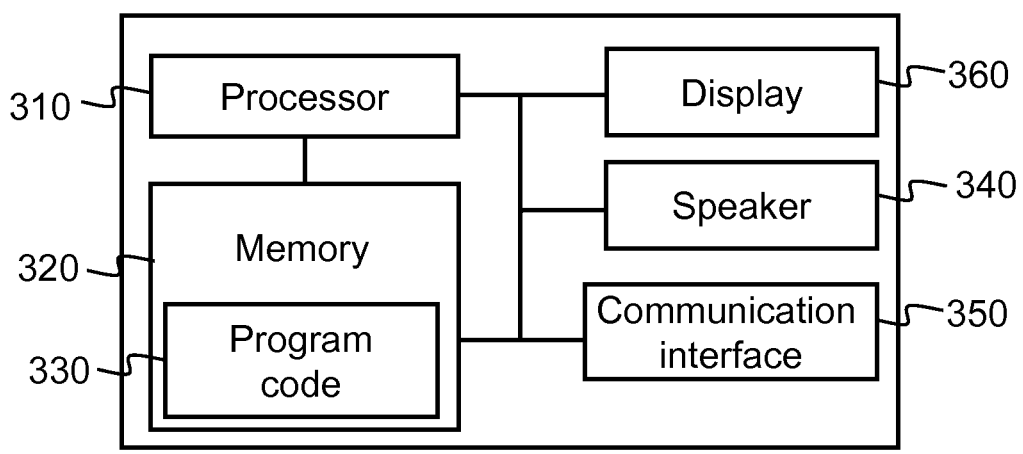
FIG. 3 presents an example block diagram of an A/V output apparatus.

FIG. 3 presents an example block diagram of an A/V output apparatus 110 in which various aspects of the disclosed embodiments may be applied. The A/V output apparatus 110 may be a television comprising a communication interface, a display and a speaker.

The general structure of the A/V output apparatus 110 comprises a communication interface 350, a display 360, a processor 310, and a memory 320 coupled to the processor 310. The A/V output apparatus 110 further comprises software 330 stored in the memory 320 and operable to be loaded into and executed in the processor 310. The software 330 may comprise one or more software modules and can be in the form of a computer program product.

The processor 310 may be, e.g., a central processing unit (CPU), a microprocessor, a digital signal processor (DSP), a graphics processing unit, or the like. FIG. 3 shows one processor 310, but the A/V output apparatus 110 may comprise a plurality of processors.

The memory 320 may be for example a non-volatile or a volatile memory, such as a read-only memory (ROM), a programmable read-only memory (PROM), erasable programmable read-only memory (EPROM), a random-access memory (RAM), a flash memory, a data disk, an optical storage, a magnetic storage, a smart card, or the like. The A/V output apparatus 110 may comprise a plurality of memories. The memory 320 may be constructed as a part of the A/V output apparatus 110 or it may be inserted into a slot, port, or the like of the A/V output apparatus 110 by a user. The memory 320 may serve the sole purpose of storing data, or it may be constructed as a part of an apparatus serving other purposes, such as processing data.

The speaker 340 may comprise a loudspeaker or multiple loudspeakers. Furthermore, the speaker 340 may comprise a jack for headphones and the headphones.

The display 360 may comprise a LED screen, a LCD screen or a plasma screen, for example.

The communication interface module 350 implements at least part of data transmission. The communication interface module 350 may comprise, e.g., a wireless or a wired interface module. The wireless interface may comprise such as a WLAN, Bluetooth, infrared (IR) or radio frequency identification (RF ID) radio module. The wired interface may comprise such as universal serial bus (USB), HDMI, SCART or RCA, for example. The communication interface module 350 may be integrated into the A/V output apparatus 110, or into an adapter, card or the like that may be inserted into a suitable slot or port of the A/V output apparatus 110. The communication interface module 350 may support one radio interface technology or a plurality of technologies. The communication interface module 350 may support one wired interface technology or a plurality of technologies. The A/V output apparatus 110 may comprise a plurality of communication interface modules 350.

A skilled person appreciates that in addition to the elements shown in FIG. 3, the A/V output apparatus 110 may comprise other elements, such as microphones, speakers, as well as additional circuitry such as input/output (I/O) circuitry, memory chips, application-specific integrated circuits (ASIC), processing circuitry for specific purposes such as source coding/decoding circuitry, channel coding/decoding circuitry, ciphering/deciphering circuitry, and the like. Additionally, the A/V output apparatus 110 may comprise a disposable or rechargeable battery (not shown) for powering when external power if external power supply is not available.

Figure 4:
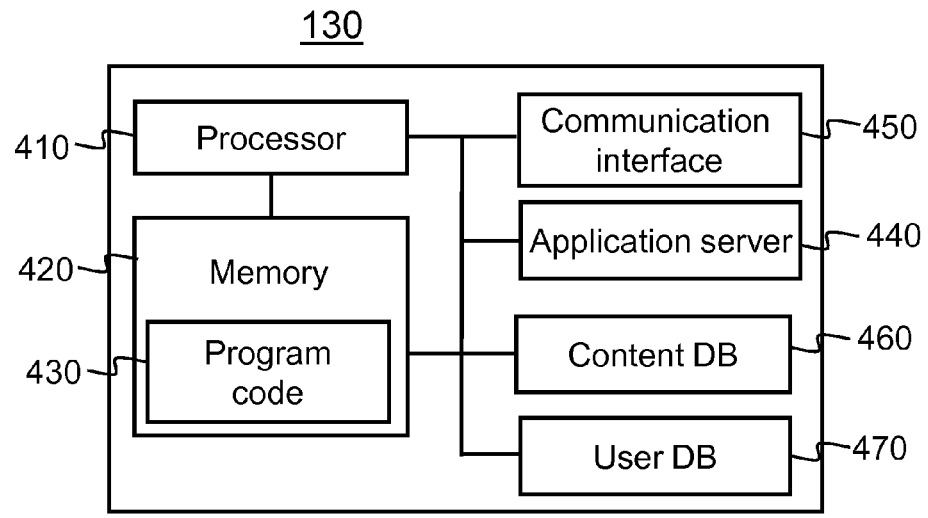
FIG. 4 presents an example block diagram of a system server apparatus.

FIG. 4 presents an example block diagram of a system server apparatus 130 in which various aspects of the disclosed embodiments may be applied.

The general structure of the system server apparatus 130 comprises a processor 410, and a memory 420 coupled to the processor 410. The server apparatus 130 further comprises software 430 stored in the memory 420 and operable to be loaded into and executed in the processor 410. The software 430 may comprise one or more software modules and can be in the form of a computer program product.

The processor 410 may be, e.g., a central processing unit (CPU), a microprocessor, a digital signal processor (DSP), a graphics processing unit, or the like. FIG. 4 shows one processor 410, but the server apparatus 130 may comprise a plurality of processors.

The memory 420 may be for example a non-volatile or a volatile memory, such as a read-only memory (ROM), a programmable read-only memory (PROM), erasable programmable read-only memory (EPROM), a random-access memory (RAM), a flash memory, a data disk, an optical storage, a magnetic storage, a smart card, or the like. The system server apparatus 130 may comprise a plurality of memories. The memory 420 may be constructed as a part of the system server apparatus 130 or it may be inserted into a slot, port, or the like of the system server apparatus 130 by a user. The memory 420 may serve the sole purpose of storing data, or it may be constructed as a part of an apparatus serving other purposes, such as processing data.

The communication interface module 450 implements at least part of data transmission. The communication interface module 450 may comprise, e.g., a wireless or a wired interface module. The wireless interface may comprise such as a WLAN, Bluetooth, infrared (IR), radio frequency identification (RF ID), GSM/GPRS, CDMA, WCDMA, or LTE (Long Term Evolution) radio module. The wired interface may comprise such as Ethernet or universal serial bus (USB), for example. The communication interface module 450 may be integrated into the server apparatus 130, or into an adapter, card or the like that may be inserted into a suitable slot or port of the system server apparatus 130. The communication interface module 450 may support one radio interface technology or a plurality of technologies. Configuration information between the videophone input apparatus 120 and the system server apparatus 130 may be transceived using the communication interface 450. Similarly, account creation information between the system server apparatus 130 and a service provider may be transceived using the communication interface 450.

An application server 440 provides application services e.g. relating to the user accounts stored in a user database 470 and to the service information stored in a service database 460. The service information may comprise content information, content management information or metrics information, for example.

A skilled person appreciates that in addition to the elements shown in FIG. 4, the system server apparatus 130 may comprise other elements, such as microphones, displays, as well as additional circuitry such as input/output (I/O) circuitry, memory chips, application-specific integrated circuits (ASIC), processing circuitry for specific purposes such as source coding/decoding circuitry, channel coding/decoding circuitry, ciphering/deciphering circuitry, and the like.

Figure 5:
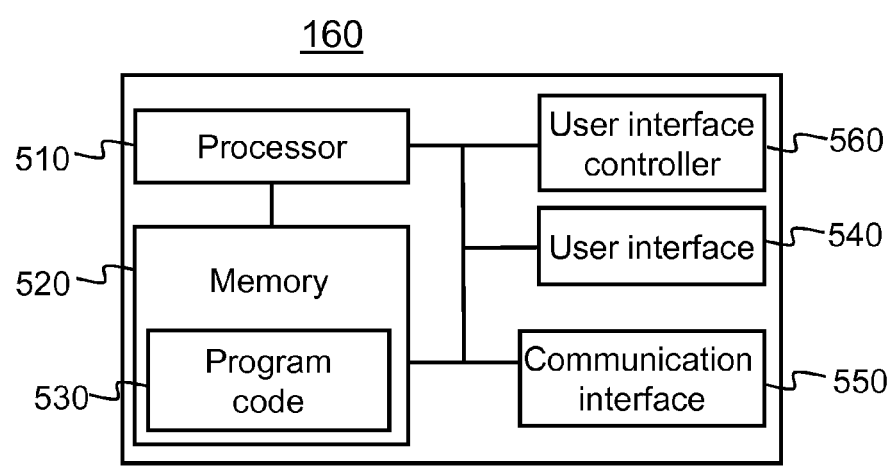
FIG. 5 presents an example block diagram of a peer apparatus.

FIG. 5 presents an example block diagram of a peer apparatus 160 in which various aspects of the disclosed embodiments may be applied. The peer apparatus 160 may be a user equipment (UE), user device or apparatus, such as a mobile terminal, a smart phone, a laptop computer, a desktop computer or other communication device.

The general structure of the peer apparatus 160 comprises a user interface 540, a communication interface 550, a processor 510, and a memory 520 coupled to the processor 510. The peer apparatus 160 further comprises software 530 stored in the memory 520 and operable to be loaded into and executed in the processor 510. The software 530 may comprise one or more software modules and can be in the form of a computer program product. The peer apparatus 160 may further comprise a user interface controller 560.

In an embodiment, the peer apparatus 160 may be remotely controlled by an external apparatus in a similar way as described before in this description between the videophone apparatus 120 and the mobile apparatus 170.

The processor 510 may be, e.g., a central processing unit (CPU), a microprocessor, a digital signal processor (DSP), a graphics processing unit, or the like. FIG. 5 shows one processor 510, but the computer apparatus 160 may comprise a plurality of processors.

The memory 520 may be for example a non-volatile or a volatile memory, such as a read-only memory (ROM), a programmable read-only memory (PROM), erasable programmable read-only memory (EPROM), a random-access memory (RAM), a flash memory, a data disk, an optical storage, a magnetic storage, a smart card, or the like. The peer apparatus 160 may comprise a plurality of memories. The memory 520 may be constructed as a part of the peer apparatus 160 or it may be inserted into a slot, port, or the like of the peer apparatus 160 by a peer user. The memory 520 may serve the sole purpose of storing data, or it may be constructed as a part of an apparatus serving other purposes, such as processing data.

The user interface controller 560 may comprise circuitry for receiving input from a user of the peer apparatus 160, e.g., via a keyboard, graphical user interface shown on the display of the user interfaces 540 of the peer apparatus 160, speech recognition circuitry, or an accessory device, such as a headset, and for providing output to the peer user via, e.g., a graphical user interface or a loudspeaker.

The communication interface module 550 implements at least part of radio transmission. The communication interface module 550 may comprise, e.g., a wireless or a wired interface module. The wireless interface may comprise such as a WLAN, Bluetooth, infrared (IR), radio frequency identification (RF ID), GSM/GPRS, CDMA, WCDMA, or LTE (Long Term Evolution) radio module. The wired interface may comprise such as universal serial bus (USB) or Ethernet, for example. The communication interface module 550 may be integrated into the peer apparatus 160, or into an adapter, card or the like that may be inserted into a suitable slot or port of the computer apparatus 160. The communication interface module 550 may support one radio interface technology or a plurality of technologies. The peer apparatus 160 may comprise a plurality of communication interface modules 550.

A skilled person appreciates that in addition to the elements shown in FIG. 5, the peer apparatus 160 may comprise other elements, such as microphones, extra displays, as well as additional circuitry such as input/output (I/O) circuitry, memory chips, application-specific integrated circuits (ASIC), processing circuitry for specific purposes such as source coding/decoding circuitry, channel coding/decoding circuitry, ciphering/deciphering circuitry, and the like. Additionally, the peer apparatus 160 may comprise a disposable or rechargeable battery (not shown) for powering when external power if external power supply is not available.

Figure 6:
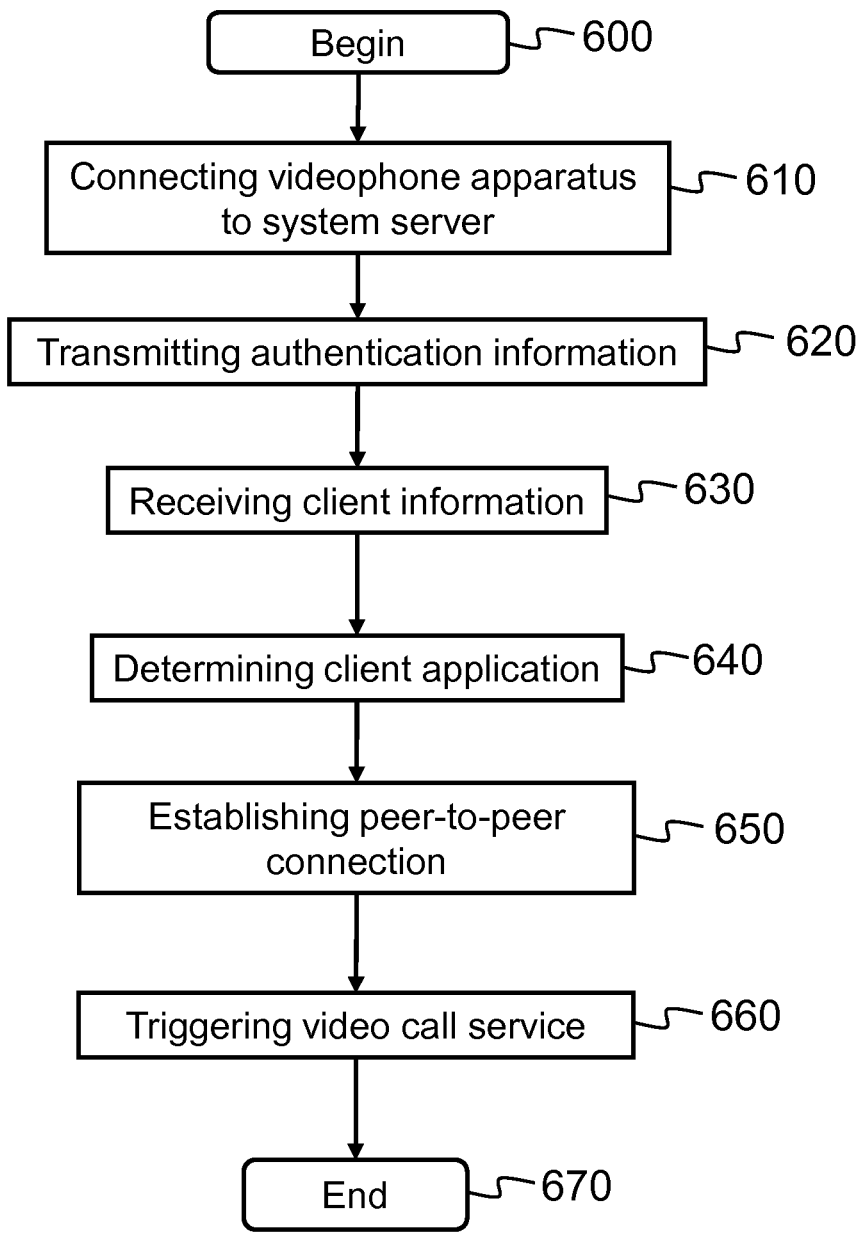
FIG. 6 shows a flow diagram showing operations in accordance with an aspect of the disclosed embodiments.

FIG. 6 shows a flow diagram showing operations in accordance with an example embodiment. In step 600, the method is started. Such step may correspond to a first time the video apparatus 120 is powered up. In step 610, a videophone apparatus is connected via a first wireless connection to a system server. In step 620, authentication information is transmitted from the videophone apparatus to the system server via the first wireless connection, upon which the system server authenticates the videophone apparatus and the system server initiates automatic account generation for at least one video call service. In step 630, client information is received from the system server. In step 640, a client application is determined based on the received client information. In step 650, a peer-to-peer connection is established between the videophone apparatus and the peer over a second wireless connection. In step 660, a video call service is triggered over the peer-to-peer connection utilizing the determined client application and the account generated by the system server. The method is ended in step 670.

Figure 7:
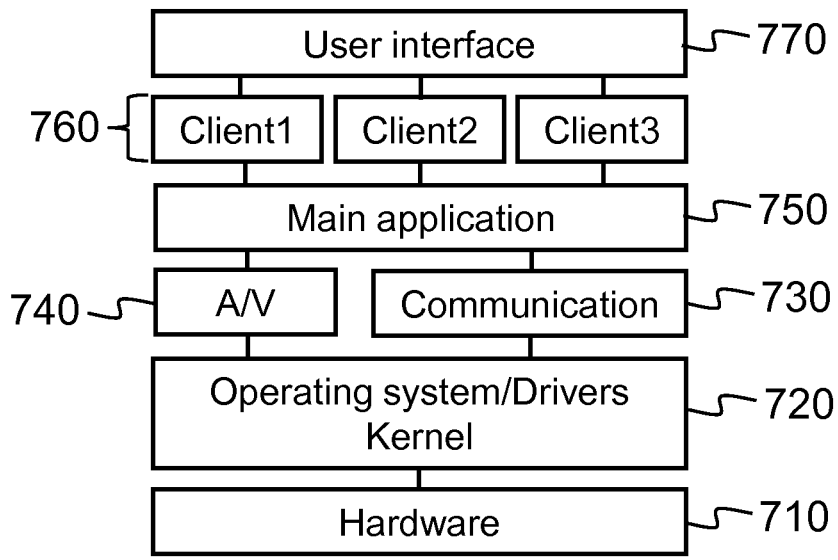
FIG. 7 shows a schematic picture of a stack relating to a videophone apparatus.

FIG. 7 shows a schematic picture of a stack relating to a videophone apparatus 120 according to an example embodiment.

Hardware 710 comprises all hardware components of the videophone apparatus 120, such as processor, memory, camera and RF, for example. Next level 720 of the stack comprises operating system, drivers and kernel. With the aid of the firmware and device drivers, the kernel provides the most basic level of control over all of the hardware of the apparatus. The kernel may manage memory access for programs in the RAM, determine which programs get access to which hardware resources, set up or reset the CPU's operating states for optimal operation at all times, and organize the data for long-term non-volatile storage with file systems on such media as disks, tapes, flash memory, etc.

The operating system provides an interface between an application program 750 and the hardware 710, so that the application program 750 can interact with the hardware 710 only by obeying rules and procedures programmed into the operating system 720. The operating system is also a set of services which simplify development and execution of application programs. Executing an application program involves the creation of a process by the operating system kernel which assigns memory space and other resources, establishes a priority for the process in multi-tasking systems, loads program binary code into memory, and initiates execution of the application program which then interacts with the user and with hardware devices.

An audio/video (A/V) level 740 of the stack provides communication functionalities for the audio and video data between the videophone apparatus 120 and the A/V output apparatus 110, such as a television, for example.

A communication level 730 of the stack provides communication functionalities for the wireless communications between the videophone apparatus 120 and the system server apparatus 130, for example.

A main application level 750 comprises the main application layer of the apparatus 120. On top of the application layer 750, plurality of clients 760 may exist. A call client may comprise a videophone call client, for example, such as a Skype client. Furthermore, a messaging client may provide messaging services, such as Google Talk, video-on-demand (e.g. Netflix or Voddler), virtual DVR services or audio services (e.g. Spotify), for example. Any IP-based audio/visual content may be delivered by the videophone apparatus 120. On top of the stack, a user interface level 770 is provided. The user interface level 770 is configured to provide the format, content and outlook of the information to a user of the apparatus 120.

Figure 8:
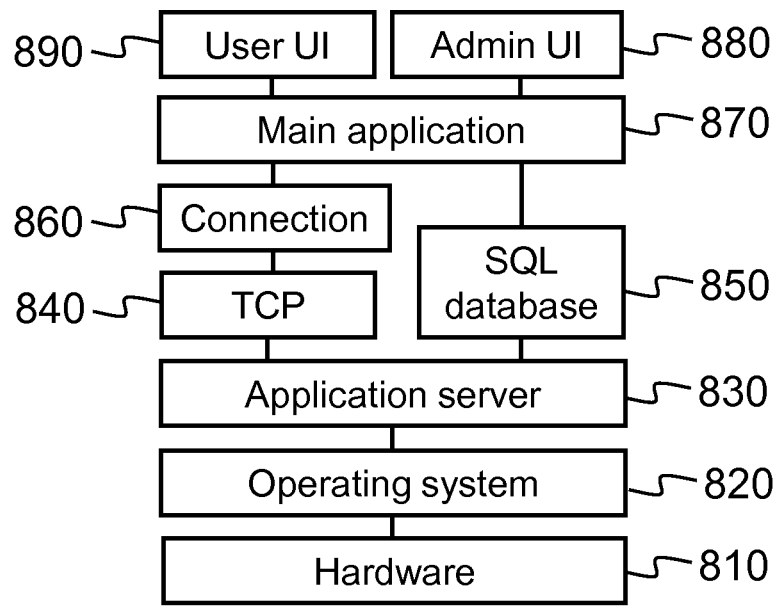
FIG. 8 shows a schematic picture of a stack relating to a system server apparatus.

FIG. 8 shows a schematic picture of a stack relating to a system server apparatus 130 according to an example embodiment.

Hardware 810 comprises all hardware components of the system server apparatus 130, such as processor and memory, for example.

Next level 820 of the stack comprises operating system, implemented by Linux, for example. The operating system 820 provides an interface between an application server 820, a main application 870 and the hardware 810, configuring interaction with the hardware 810 only by obeying rules and procedures programmed into the operating system 820. The operating system 820 is also a set of services which simplify development and execution of application programs. Executing an application program involves the creation of a process by the operating system which assigns memory space and other resources, establishes a priority for the process in multi-tasking systems, loads program binary code into memory, and initiates execution of the application program which then interacts with the main application, users and hardware devices 810.

An application server 830 provides runtime environment for server-side components (such as Java servlets and Java server pages). The application server 830 may contain the further architectural components, such as web container, name server and security server, for example. The web container runs within the application server 830 and handles requests for servlets, Java server page files, and the web applications that contain them. The security server may provide security infrastructure and mechanisms to protect sensitive application resources and administrative resources and to address enterprise end-to-end security requirements on authentication, on resource access control, on data integrity, confidentiality, and privacy, and on secure interoperability.

A transmission control protocol (TCP) layer 840 of the server stack enables that the system server apparatus 130 may serve several clients 120, 160 concurrently, by creating a child process for each client and establishing a TCP connection between the child process and the client. Unique TCP sockets are created for each connection 860. The connections 860 are in established state, when a socket-to-socket virtual connection (TCP session), is established with the remote socket, providing a duplex byte stream. The system server apparatus 130 may create several concurrently established TCP sockets with the same local port number and local internet protocol (IP) address, each mapped to its own server-child process, serving its own client process. They are treated as different sockets by the operating system 820, since the remote socket address (the client IP address and/or port number) are different.

A structured query language (SQL) database level 850 of the stack provides communication functionalities for the system server apparatus 130 between the system server apparatus 130 and the database 131, 460, 470, for example.

A main application level 870 comprises the main application layer of the system server apparatus 130. The system server main application 870 may correspond to the client side main application 750 described in FIG. 7. On top of the application layer 870, plurality of user interface layers may exist. The client user interface level 890 is configured to provide the format, content and outlook of the information to a user of the apparatus 120. The administrator user interface level 880 is configured to provide the format, content and outlook of the information to the administrator of the system server 130 and the system 100.

Various embodiments have been presented. It should be appreciated that in this document, words comprise, include and contain are each used as open-ended expressions with no intended exclusivity. If desired, the different functions discussed herein may be performed in a different order and/or concurrently with each other. Furthermore, if desired, one or more of the above-described functions may be optional or may be combined. Although various aspects of the disclosed embodiments are set out in the independent claims, other aspects comprise other combinations of features from the described embodiments and/or the dependent claims with the features of the independent claims, and not solely the combinations explicitly set out in the claims.

The foregoing description has provided by way of non-limiting examples of particular implementations and embodiments of the invention a full and informative description of the best mode presently contemplated by the inventors for carrying out the invention. It is however clear to a person skilled in the art that the invention is not restricted to details of the embodiments presented above, but that it can be implemented in other embodiments using equivalent means or in different combinations of embodiments without deviating from the characteristics of the invention.

Furthermore, some of the features of the above-disclosed embodiments may be used to advantage without the corresponding use of other features. As such, the foregoing description shall be considered as merely illustrative of the principles of the present invention, and not in limitation thereof. Hence, the scope of the invention is only restricted by the appended patent claims.

The invention claimed is:

1. A videophone apparatus comprising:
   a communication interface for communicating with a system server and a peer;
   at least one processor; and
   at least one memory including computer program code;

the at least one memory and the computer program code configured to, with the at least one processor, cause the videophone apparatus to:
  connect the videophone apparatus via a first wireless connection to the system server;
  transmit authentication information from the videophone apparatus to the system server via the first wireless connection for initiating account generation for at least one video call service;
  receive client information from the system server;
  determine a client application based on the received client information;
  establish a peer-to-peer connection between the videophone apparatus and the peer over a second wireless connection; and
  trigger a video call service over the peer-to-peer connection utilizing the determined client application and the account generated by the system server.

2. The videophone apparatus of claim 1, wherein the first and the second wireless connection comprise at least one of the following:
  a cellular network data connection; and
  a wireless local area network (WLAN) connection.

3. The videophone apparatus of claim 1, further comprising a videophone input apparatus and an A/V output apparatus, wherein the videophone input apparatus not comprising a display.

4. The videophone apparatus of claim 1, wherein the authentication information comprising at least one credential.

5. The videophone apparatus of claim 4, wherein the credential comprising at least one of the following:
  an International Mobile Equipment Identity (IMEI);
  an International Mobile Subscriber Identity (IMSI);
  a Mobile Subscriber ISDN Number (MSISDN);
  a unique hardware identifier (HWID);
  a unique software identifier (SWID); and
  a unique service identifier (SVID).

6. The videophone apparatus of claim 1, wherein the at least one memory and the computer program code further configured to, with the at least one processor, cause the videophone apparatus to:
  receive an incoming video call request from the peer;
  transmit information on the received incoming video call request to the system server; and
  receive client information from the system server in response to the transmitted information.

7. The videophone apparatus of claim 1, wherein the client information comprising at least one of the following:
  a client application identifier for determining the client application;
  a username of the account generated by the system server; and
  a password of the account generated by the system server.

8. A system server comprising:
  a communication interface for communicating with a videophone apparatus and a service provider;
  at least one processor; and
  at least one memory including computer program code;
  the at least one memory and the computer program code configured to, with the at least one processor, cause the system server to:
    connect the system server via a first wireless connection to the videophone apparatus;
    receive authentication information from the videophone apparatus via the first wireless connection to initiate account generation for at least one video call service;
    connect the system server to the service provider of a video call service;
    initiate account generation for the video call service; and
    transmit client information to the videophone apparatus based on account information of the generated account to determine a client application in the videophone apparatus based on the client information, to establish a peer-to-peer connection between the videophone apparatus and a peer over a second wireless connection; and
    to trigger a video call service over the peer-to-peer connection utilizing the determined client a application and the account generated by the system server.

9. The system server of claim 8, wherein the account information comprises a user account and a password.

10. The system server of claim 8, wherein the at least one memory and the computer program code further configured to, with the at least one processor, cause the system server to:
  maintain the account information for the video call service.

11. The system server of claim 8, wherein the account information comprising peer contact information, and
  the at least one memory and the computer program code further configured to, with the at least one processor, cause the system server to:
  receive contact information from the service provider; and
  update the peer contact information based on the received contact information.

12. A method comprising:
  connecting a videophone apparatus via a first wireless connection to a system server;
  transmitting authentication information from the videophone apparatus to the system server via the first wireless connection for initiating account generation for at least one video call service;
  receiving client information from the system server;
  determining a client application based on the received client information;
  establishing a peer-to-peer connection between the videophone apparatus and the peer over a second wireless connection; and
  triggering a video call service over the peer-to-peer connection utilizing the determined client application and the account generated by the system server.

13. A computer program embodied on a computer readable non-transitory medium comprising computer executable program code, which when executed by at least one processor of a videophone apparatus, causes the videophone apparatus to:
  connect a videophone apparatus via a first wireless connection to a system server;
  transmit authentication information from the videophone apparatus to the system server via the first wireless connection for initiating account generation for at least one video call service;
  receive client information from the system server;
  determine a client application based on the received client information;
  establish a peer-to-peer connection between the videophone apparatus and the peer over a second wireless connection; and
  trigger a video call service over the peer-to-peer connection utilizing the determined client application and the account generated by the system server.

14. A system comprising:
  a videophone apparatus, configured to:
    connect the videophone apparatus via a first wireless connection to a system server;

transmit authentication information from the videophone apparatus to the system server via the first wireless connection;
receive client information from the system server;
determine a client application based on the received client information;
establish a peer-to-peer connection between the videophone apparatus and the peer over a second wireless connection; and
trigger a video call service over the peer-to-peer connection utilizing the determined client application and the account generated by the system server;

the system server, configured to:
receive authentication information from the videophone apparatus via the first wireless connection;
connect the system server to a service provider of a video call service;
initiate account generation for the video call service; and
transmit client information to the videophone apparatus based on account information of the generated account;

a peer configured to:
establish the peer-to-peer connection between the videophone apparatus over a second wireless connection; and the service provider, configured to:
provide video call service.

* * * * *